United States Patent
Kim et al.

(10) Patent No.: US 9,542,030 B2
(45) Date of Patent: Jan. 10, 2017

(54) DISPLAY DEVICE WITH INTEGRATED TOUCH SCREEN HAVING VARIED TOUCH DRIVING TIME AND METHOD OF DRIVING THE SAME

(71) Applicant: LG DISPLAY CO., LTD., Seoul (KR)

(72) Inventors: Sung Chul Kim, Goyang-si (KR); Jeong Seop Lee, Gimje-si (KR); Seung Eun Pyo, Incheon (KR)

(73) Assignee: LG Display Co., Ltd., Seoul (KR)

( * ) Notice: Subject to any disclaimer, the term of this patent is extended or adjusted under 35 U.S.C. 154(b) by 398 days.

(21) Appl. No.: 14/046,413

(22) Filed: Oct. 4, 2013

(65) Prior Publication Data

US 2014/0160067 A1    Jun. 12, 2014

(30) Foreign Application Priority Data

Dec. 11, 2012 (KR) .......................... 10-2012-0143993

(51) Int. Cl.
G06F 3/044 (2006.01)
G06F 3/041 (2006.01)

(52) U.S. Cl.
CPC .................... *G06F 3/0416* (2013.01)

(58) Field of Classification Search
CPC ........................................................ G06F 3/041
See application file for complete search history.

(56) References Cited

U.S. PATENT DOCUMENTS

| | | | |
|---|---|---|---|
| 2010/0283752 A1* | 11/2010 | Maeda | G06F 3/044 345/173 |
| 2011/0043483 A1 | 2/2011 | Mizuhashi et al. | |
| 2011/0267293 A1* | 11/2011 | Noguchi | G06F 3/0416 345/173 |
| 2012/0050217 A1* | 3/2012 | Noguchi | G06F 3/0412 345/174 |
| 2012/0068964 A1 | 3/2012 | Wright et al. | |
| 2013/0314360 A1 | 11/2013 | Saitoh et al. | |

FOREIGN PATENT DOCUMENTS

| | | |
|---|---|---|
| CN | 101788868 A | 7/2010 |
| CN | 101866231 A | 10/2010 |
| KR | 1020120067250 A | 6/2012 |

\* cited by examiner

*Primary Examiner* — Quan-Zhen Wang
*Assistant Examiner* — David Lee
(74) *Attorney, Agent, or Firm* — Brinks Gilson & Lione

(57) ABSTRACT

Disclosed is a display device with integrated touch screen that may include a panel including a plurality of electrodes; a touch IC that applies a touch scan signal to the plurality of electrodes during a predetermined period of an n−1th frame ('n' is an integer above 2), and checking whether or not there is a touch input in the panel through the use of information received from the plurality of electrodes; and a display driver IC that applies a common voltage to the plurality of electrodes during a first period of an nth frame if there is the touch input in the panel, and applying the common voltage to the plurality of electrodes during a second period of the nth frame if there is no touch input in the panel, wherein the second period is longer than the first period.

12 Claims, 5 Drawing Sheets

DISPLAY DEVICE WITH INTEGRATED TOUCH SCREEN HAVING VARIED TOUCH DRIVING TIME AND METHOD OF DRIVING THE SAME

CROSS REFERENCE TO RELATED APPLICATIONS

This application claims the benefit of the Korean Patent Application No. 10-2012-0143993 filed on Dec. 11, 2012, which is hereby incorporated by reference as if fully set forth herein.

BACKGROUND

Field of the Disclosure

Embodiments of the present disclosure relate to a display device, and more particularly, to a display device with integrated touch screen.

Discussion of the Related Art

Touch screens are a type of input device that is included in image displaying devices such as Liquid Crystal Displays (LCDs), Field Emission Displays (FEDs), Plasma Display Panel (PDPs), Electroluminescent Displays (ELDs), and Electrophoretic Display (EPDs), and allows a user to input information by pressing or touching a touch sensor of a screen with a finger, a pen or the like while a user looks at the screen of the image displaying device.

Recently, there is an increasing demand for a display device with integrated touch screen of in-cell type in which elements constituting the touch screen are provided inside the display device so as to realize slimness in mobile terminals such as smart phone and tablet PC.

In case of a general in-cell type touch screen, touch data is transmitted to a system once every one vertical sync signal Vsync to define one frame period. Hereinafter, a driving method of a general display device with integrated touch screen of in-cell type will be described with reference to FIG. 1.

FIG. 1 is a timing diagram illustrating signals of display time and touch time according to one vertical sync signal in a general display device with integrated touch screen.

In case of a general display device with integrated self-capacitive touch screen of an in-cell type, as shown in FIG. 1, display time (D) and touch time (T) are time-divisionally driven according to a data enable DE signal during one frame based on one vertical sync signal.

SUMMARY

A display device with integrated touch screen that may include a panel including a plurality of electrodes; a touch IC that applies a touch scan signal to the plurality of electrodes during a predetermined period of an n−1th frame ('n' is an integer above 2), and checking whether or not there is a touch input in the panel through the use of information received from the plurality of electrodes; and a display driver IC that applies a common voltage to the plurality of electrodes during a first period of an nth frame if there is the touch input in the panel, and applying the common voltage to the plurality of electrodes during a second period of the nth frame if there is no touch input in the panel, wherein the second period is longer than the first period.

In another aspect of an embodiment of the present invention, there is provided a method of driving a display device with integrated touch screen that may include applying a touch scan signal from a touch IC to a plurality of electrodes during a predetermined period of an n−1th frame ('n' is an integer above 2), and checking whether or not there is a touch input in the panel through the use of information received from the plurality of electrodes; applying a common voltage from a display driver IC to the plurality of electrodes during a first period of an nth frame if there is the touch input in the panel; and applying the common voltage from the display driver IC to the plurality of electrodes during a second period of the nth frame if there is no touch input in the panel, wherein the second period is longer than the first period.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EXEMPLARY EMBODIMENTS

Hereinafter, embodiments of the present invention will be described in detail with reference to the accompanying drawings.

Figure 1:
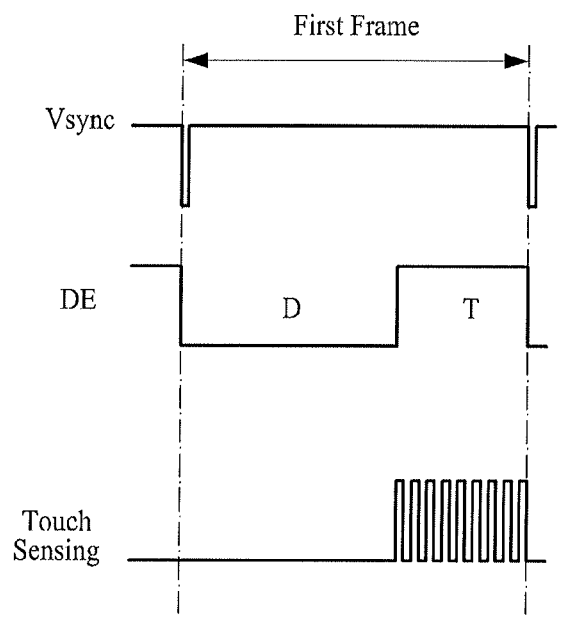
FIG. 1 is a timing diagram illustrating signals of display time and touch time according to one vertical sync signal in a general display device with integrated touch screen.
Figure 2:
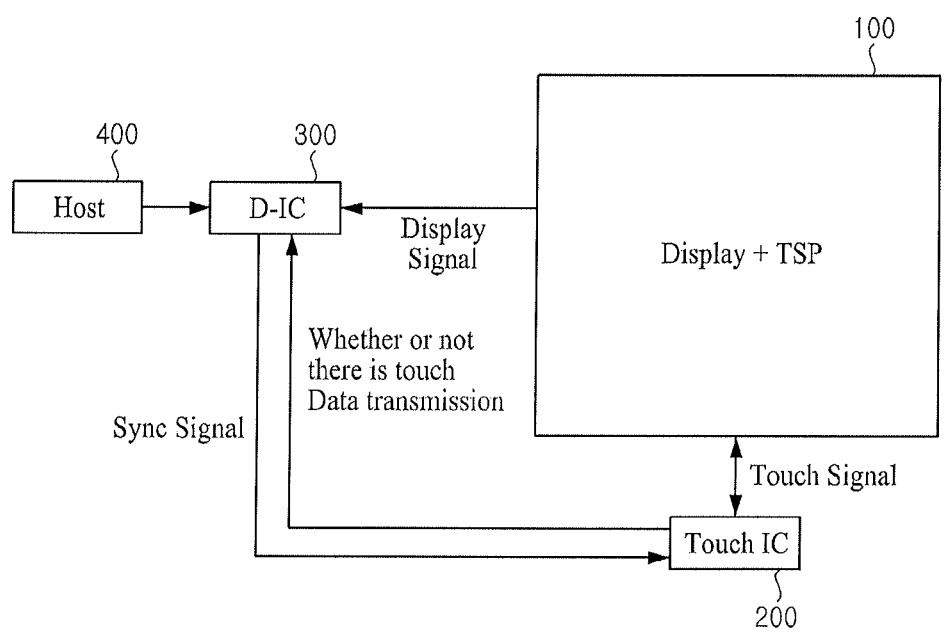
FIG. 2 briefly illustrates a structure of a display device with integrated touch screen according to one embodiment of the present invention.
Figure 3:
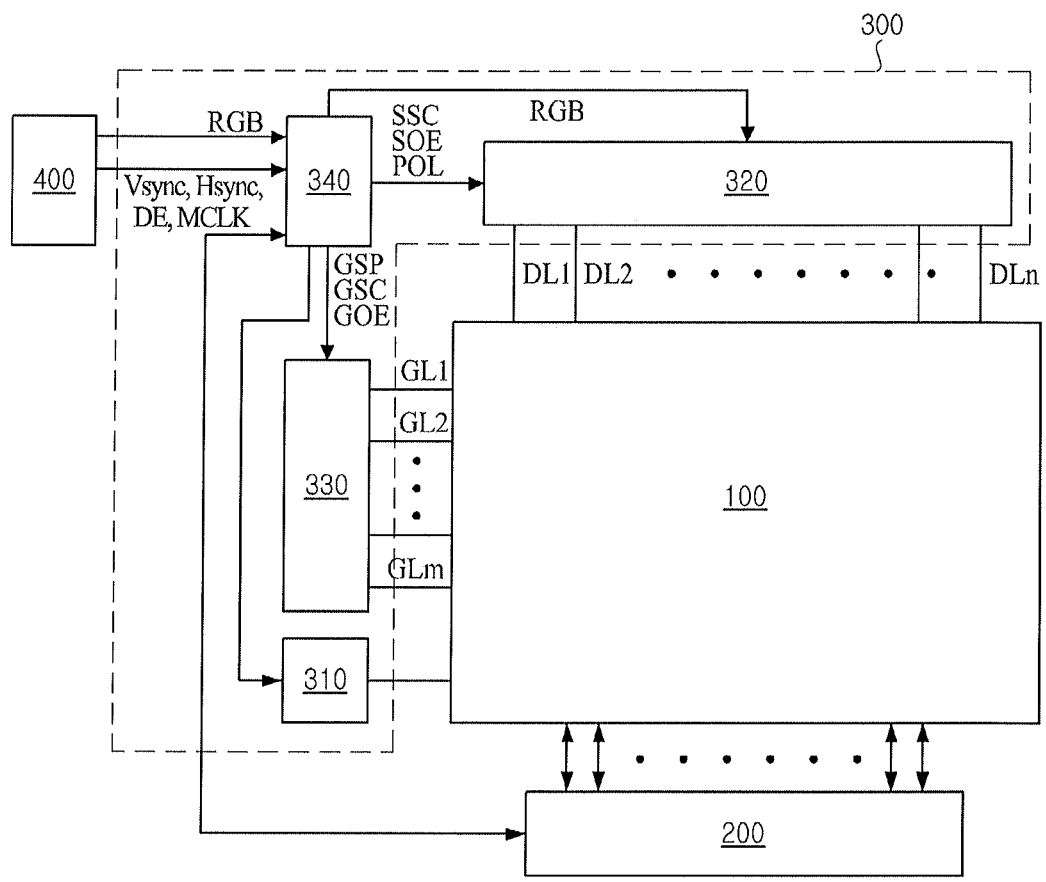
FIG. 3 illustrates a detailed structure of a display device with integrated touch screen according to one embodiment of the present invention.

FIGS. 2 and 3 illustrate a display device with integrated touch screen according to one embodiment of the present invention.

As shown in FIG. 2, the display device with integrated touch screen according to one embodiment of the present invention may include a panel 100, a touch IC 200, a display driver IC 300, and a host system 400.

A touch screen (not shown) is provided inside the panel 100. The touch screen senses a user's touch location. Especially, the touch screen applied to the present invention is an in-cell type touch screen of a self-capacitive type which is time-divisionally driven in display driving and touch driving modes.

The panel 100 may be configured with lower and upper substrates, and a liquid crystal layer formed between the two substrates. In this case, a plurality of gate lines, a plurality of data lines, and a plurality of thin film transistors (TFT) are formed on the lower substrate of the panel 100. In this case, the gate and data lines cross each other, to thereby form a plurality of pixels in a matrix configuration. Also, each thin film transistor is formed adjacent to a crossing region of the gate and data lines.

Although not shown, the panel 100 may include a plurality of electrodes, and a plurality of lines.

If applying a common voltage for the display driving of the panel 100, the plurality of electrodes may operate as a common electrode, wherein the electrode, together with a pixel electrode formed in each pixel, drives liquid crystal. Meanwhile, if applying a touch scan signal for sensing a touch, the plurality of electrodes may operate as a touch electrode for sensing the touch.

The plurality of lines may be provided to connect the plurality of electrodes with the touch IC 200.

The touch IC 200 may include a touch scan signal generator which generates the touch scan signal to be supplied to the plurality of electrodes of the panel 100 so as to sense the touch, and a touch sensor which senses the user's touch location by sensing a change of capacitance received from the plurality of electrodes of the panel 100.

For example, as shown in FIG. 2, if the driving mode of the panel 100 is the touch driving mode, the touch IC 200 applies the touch scan signal to the plurality of electrodes, and senses the user's touch location through the change of capacitance received from the plurality of electrodes of the panel 100.

In other words, the touch IC 200 applies the touch scan signal to the plurality of electrodes during a predetermined time period of an n−1th frame ('n' is an integer above 2), and checks whether or not there is a touch input in the panel 100 through the use of information received from the plurality of electrodes. In this case, information about the touch input may be important data which is transmitted to a timing controller 340 to determine an operation in both touch IC 200 and common voltage generator 310.

If there is the touch input in the panel 100, the touch scan signal is applied to the plurality of electrodes during a third period of an nth frame. Meanwhile, if there is no touch input in the panel 100, the touch scan signal is applied to the plurality of electrodes during a fourth period of the nth frame, wherein the fourth period is relatively shorter than the third period. Herein, the third period corresponds to a period when the touch scan signal for sensing the touch during one frame is applied in the general display device with integrated touch screen, and the fourth period corresponds to a minimum period enabling to check whether or not there is the touch input, wherein the fourth period may be the same as or less than the half of the third period.

That is, since a period of applying the touch scan signal in the current frame when there is no touch input in the panel 100 during the previous frame is shorter than a period of applying the touch scan signal in the current frame when there is the touch input in the panel 100 during the previous frame, it is possible to reduce power consumption by preventing waste of power which might be unnecessarily consumed when there is no touch input.

As shown in FIG. 3, the display driver IC 300 may include the common voltage generator 310, a data driver 320, a gate driver 330, and the timing controller 340.

In this case, the common voltage generator 310 generates the common voltage, and applies the generated common voltage to the plurality of electrodes of the panel 100. For example, if the driving mode of the panel 100 is the display driving mode, the plurality of electrodes receive the common voltage, whereby the plurality of electrodes operate as the common electrode for the display driving.

The common voltage generator 310 receives information on whether or not there is the touch input in the panel 100, which is transmitted from the touch IC 200 to the timing controller 340, and then determines a period of applying the common voltage on the basis of the received information.

For example, if there is the touch input in the panel 100, the common voltage is applied to the plurality of electrodes during a first period of the nth frame. Meanwhile, if there is no touch input in the panel 100, the common voltage is applied to the plurality of electrodes during a second period of the nth frame, wherein the second period is longer than the first period.

Herein, a period of applying the common voltage in the current frame when there is no touch input in the panel 100 during the previous frame is longer than a period of applying the common voltage in the current frame when there is the touch input in the panel 100 during the previous frame, so that it is possible to improve picture quality through the increase of display time when there is no touch input in the panel 100, and simultaneously to reduce power consumption by lowering a driving frequency.

Then, the data driver 320 converts RGB data, which is inputted from the timing controller 340 thereto, into a data voltage. The data voltage, which is outputted from the data driver 320, is supplied to data lines DL1 to DLn.

In other words, the data driver 320 sequentially generates sampling signals by shifting a source start pulse SSP, which is received from the timing controller 340, according to a source shift clock SSC. The data driver 320 latches pixel data (RGB, video data), which is inputted according to the source shift clock SSC, according to the sampling signal, converts the latched pixel data into a data signal, and then supplies the data signal to the data lines in units of horizontal line in response to a source output enable SOE signal. The data signal may include the data voltage.

To this end, the data driver 320 may include a data sampling unit, a latch unit, a digital-to-analog converter, and an output buffer.

Then, the gate driver 330 sequentially supplies a gate signal to a plurality of gate lines GL1 to GLm, selects a line of the panel 100 to which the data voltage is inputted, charges the pixels of the panel 100 with the data voltage which is inputted from the data driver 320 during a high logic period of a horizontal sync signal Hsync in response to the gate signal, and maintains the data voltage during a low logic period of the horizontal sync signal Hsync.

In other words, the gate driver 330 generates the gate signal with gate-on voltage Von by shifting a gate start pulse GSP, which is received from the timing controller 340, according to a gate shift clock GSC, sequentially supplies the gate signal with gate-on voltage to the gate lines GL1 to GLn. The gate driver 330 supplies a gate-off voltage Voff to the gate lines GL1 to GLn during the remaining period which is not supplied with the gate signal with the gate-on voltage Von. In this case, the gate signal may include a gate scan signal.

Meanwhile, the gate driver 330 applied to the present invention may be separately provided from the panel 100. That is, the gate driver 330 may be configured in such a way that the gate driver 330 may be electrically connected with the panel 100 in various methods. However, the gate driver 330 may be configured in a gate-in panel GIP method, that is, the gate driver 330 may be provided inside the panel 100. In this case, a gate control signal for controlling the gate driver 330 may be a start signal VST, and a gate clock GCLK.

The timing controller 340 may generate a control signal according to the driving mode of the panel 100, so as to apply the common voltage which is generated in the common voltage generator 310 to the panel 100, or may generate a control signal to apply the touch scan signal generated in the touch IC 200 to the panel 100.

According to the information on whether or not there is the touch input in the panel 100, which is transmitted from the touch IC 200, a signal for adjusting the period of applying the touch scan signal and the period of applying the common voltage is transmitted to the touch IC 200 and the common voltage generator 310.

Moreover, the timing controller 340 receives timing signals such as vertical sync signal Vsync, horizontal sync signal Hsync, data enable DE signal and main clock MCLK, and generates control signals GCS and DCS for controlling an operation timing of the gate driver 330 and the data driver 320. Also, the timing controller 340 re-aligns the RGB data inputted from the host system 400, and outputs the re-aligned RGB data to the data driver 320.

Herein, the vertical sync signal Vsync is a signal for defining one frame period. Thus, one cycle of the vertical sync signal Vsync is set to one frame period. Also, the horizontal sync signal Hsync is a signal for defining one horizontal period which is required for recording data in the pixels of one line in a pixel array of the panel 100. Accordingly, one cycle of the horizontal sync signal Hsync may be set to one horizontal period, and one horizontal period may be obtained by dividing one frame period by the number of lines of the panel 100. The data enable DE signal is the signal for defining a period when effective data is inputted, and one cycle is set to one horizontal period in the same manner as the horizontal sync signal Hsync. The main clock MCLK is synchronized with a bit of the RGB data.

The host system 400 of the display device with integrated touch screen according to the embodiment of the present invention provides the timing signals such as vertical sync signal Vsync, horizontal sync signal Hsync, data enable DE signal and main clock MCLK, and the RGB data to the timing controller 340.

An operation of the display device with integrated touch screen according to one embodiment of the present invention will be described in brief with reference to FIG. 4.

Figure 4:
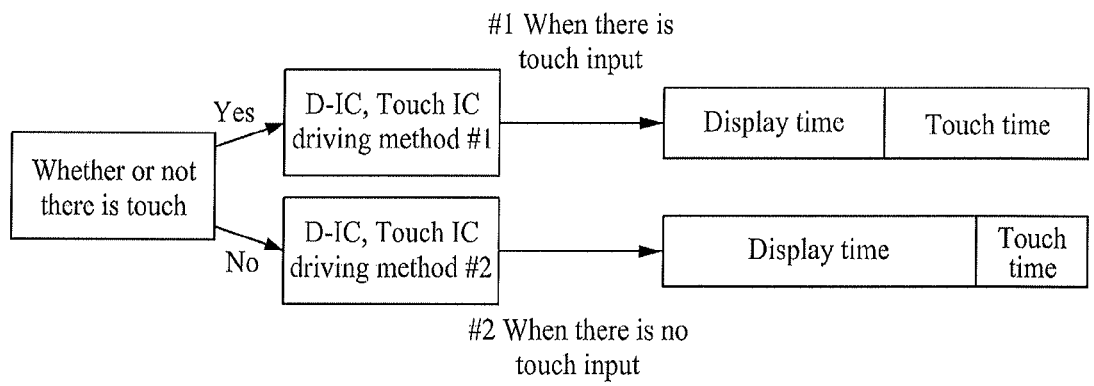
FIG. 4 is a diagram illustrating driving methods of touch IC and display driver IC according to whether or not there is a touch input in the display device with integrated touch screen according to one embodiment of the present invention.

FIG. 4 is a diagram illustrating driving methods of touch IC and display driver IC according to whether or not there is the touch input in the display device with integrated touch screen according to one embodiment of the present invention.

As shown in FIG. 4, according to the information on whether or not there is the touch input in the panel 100 during the previous frame, display time when there is no touch input in the panel 100 is longer than display time when there is the touch input in the panel 100 during the previous frame, and touch time when there is no touch input in the panel 100 is shorter than touch time when there is touch input in the panel 100 during the previous frame.

Hereinafter, a method of driving the display device with integrated touch screen according to the present invention will be described with reference to FIGS. 5 and 6.

Figure 5:
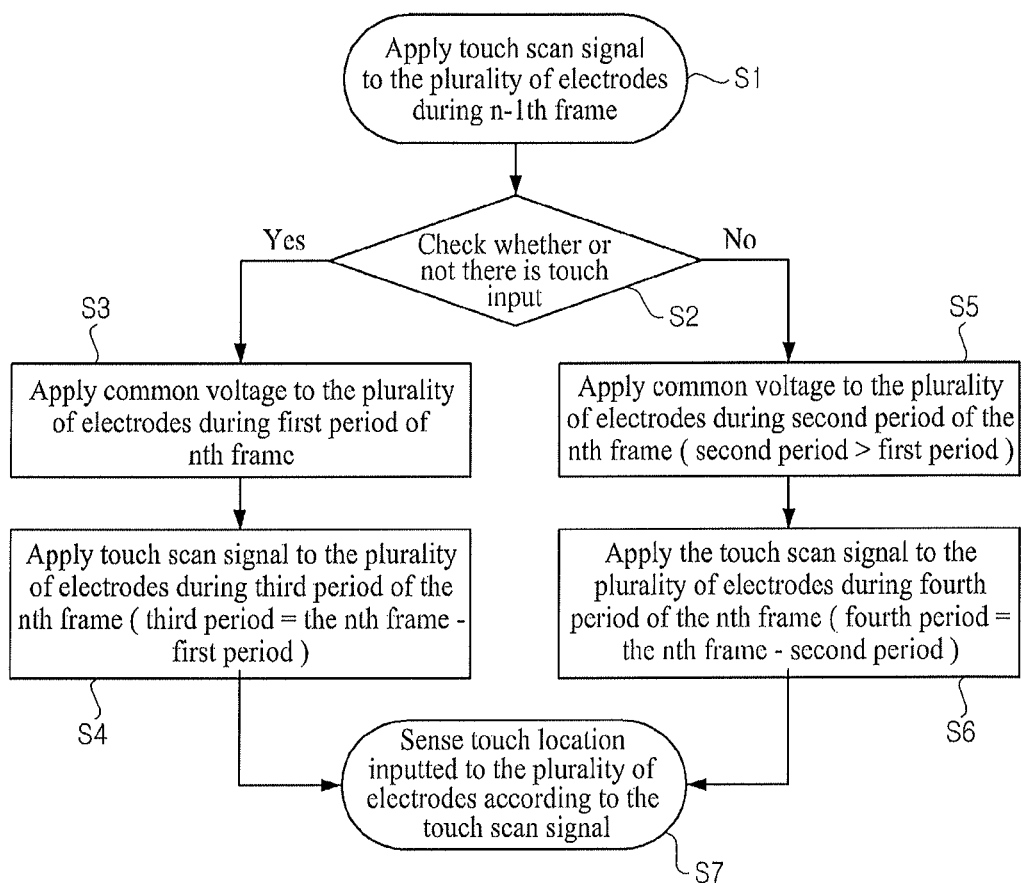
FIG. 5 is a flow chart illustrating a driving method of the display device with integrated touch screen according to one embodiment of the present invention.

FIG. 5 is a flow chart illustrating a method of driving the display device with integrated touch screen according to one embodiment of the present invention.

FIGS. 6A to 6D are timing diagrams of display time and touch time according to whether or not there is the touch input in the display device with integrated touch screen according to one embodiment of the present invention.

As shown in FIG. 5, the method of driving the display device with integrated touch screen according to one embodiment of the present invention may include applying the touch scan signal from the touch IC 200 to the plurality of electrodes of the panel 100 during the predetermined period of the n−1th frame ('n' is an integer above 2), and checking whether or not there is the touch input in the panel 100 through the use of information received from the plurality of electrodes; applying the common voltage from the display driver IC 300 to the plurality of electrodes during the first period of the nth frame when there is the touch input in the panel 100; and applying the common voltage from the display driver IC 300 to the plurality of electrodes during the second period which is relatively longer than the first period of the nth frame when there is no touch input in the panel 100.

In addition, the method of driving the display device with integrated touch screen according to one embodiment of the present invention may further include applying the touch scan signal from the touch IC 200 to the plurality of electrodes during the third period of the nth frame when there is the touch input in the panel 100, and applying the touch scan signal to from the touch IC 200 the plurality of electrodes during the fourth period of the nth frame when there is no touch input in the panel 100, wherein the fourth period is shorter than the third period.

First, the touch scan signal is applied to the plurality of electrodes during the n-1th frame (S1).

For example, the touch scan signal is applied to the plurality of electrodes during the third period or fourth period of the n−1th frame so as to check whether or not there is the touch input in the panel 100. In this case, the third period is the period of applying the touch scan signal for sensing the touch for one frame in the general display device with integrated touch screen, and the fourth period is the minimum period enabling to check whether or not there is the touch, wherein the fourth period may be the same as or less than the half of the third period.

Figure 6A:
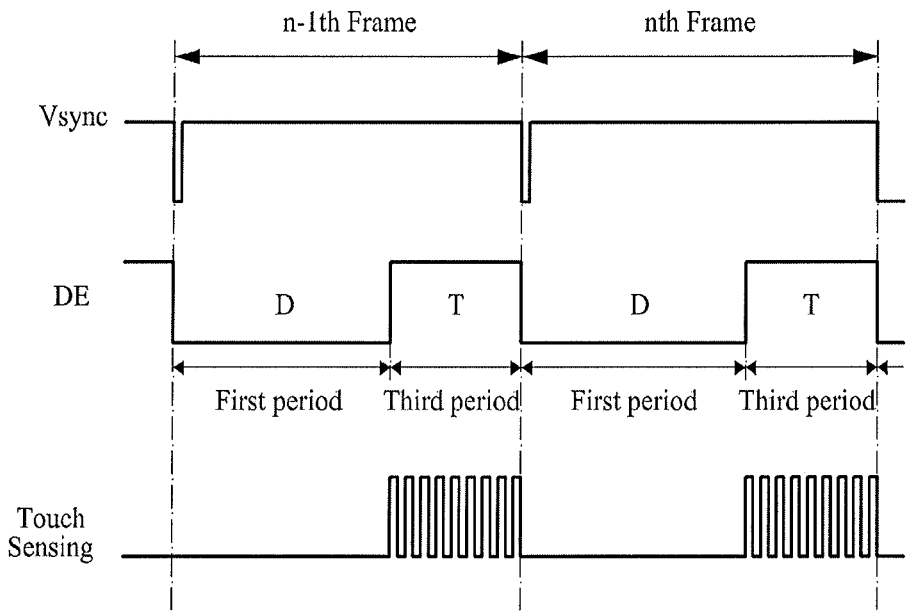
FIGS. 6A-6D is a timing diagram illustrating signals of display time and touch time according to whether or not there is the touch input in the display device with integrated touch screen according to one embodiment of the present invention.
Figure 6B:
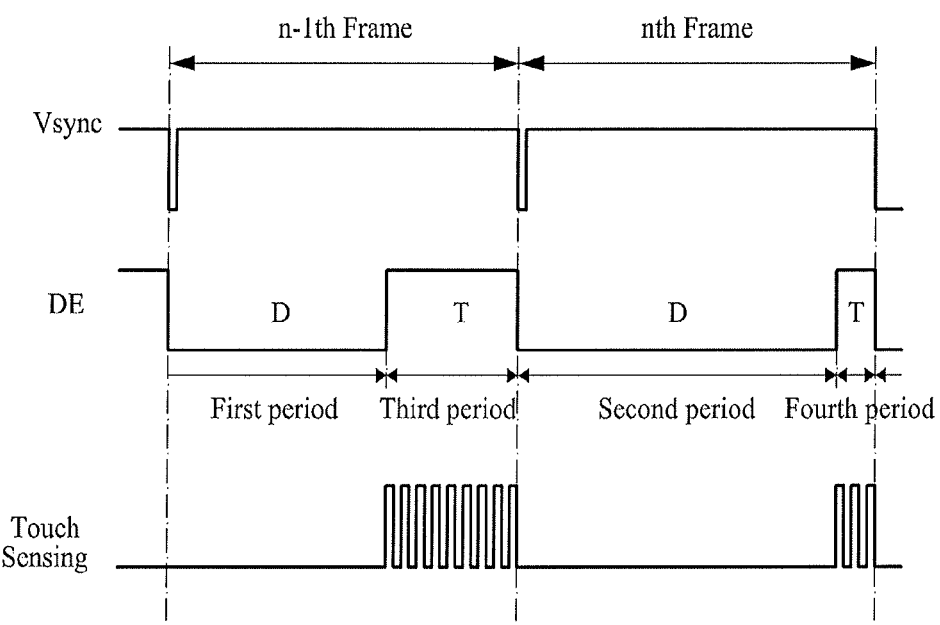

In other words, as shown in the touch-sensing timing diagram of FIGS. 6A and 6B, the touch scan signal for sensing the touch may be applied during the third period of the n−1th frame. Also, as shown in the touch-sensing timing diagram of FIGS. 6C and 6D, the touch scan signal for sensing the touch may be applied to the fourth period of the n−1th frame. If there is the touch input in an n−2th frame, the period of applying the touch scan signal in the n−1th frame becomes the third period. If there is no touch input in the n−2th frame, the period of applying the touch scan signal in the n−1th frame becomes the fourth period.

Then, it is checked whether or not there is the touch input in the plurality of electrodes of the panel 100 (S2).

If there is the touch input, the common voltage is applied to the plurality of electrodes during the first period of the nth frame (S3), and the touch scan signal is applied to the plurality of electrodes during the third period of the nth frame (S4).

As shown in FIG. 6, the third period is the remaining period except the first period during the one frame.

If there is no touch input, the common voltage is applied to the plurality of electrodes during the second period of the nth frame (S5), and the touch scan signal is applied to the plurality of electrodes during the fourth period of the nth frame (S6).

As shown in FIG. 6, the fourth period is the remaining period except the second period during one frame.

From an aspect of applying the common voltage, the common voltage is applied to the plurality of electrodes during the first period of the nth frame if there is the touch input in the panel 100, while the common voltage is applied to the plurality of electrodes during the second period of the nth frame if there is no touch input in the panel 100, wherein the second period is longer than the first period.

Herein, the period of applying the common voltage in the current frame when there is no touch input in the panel 100 during the previous frame is longer than the period of applying the common voltage in the current frame when there is the touch input in the panel 100 during the previous frame, so that it is possible to improve picture quality through the increase of display time when there is no touch input in the panel 100, and simultaneously to reduce power consumption by lowering the driving frequency.

From an aspect of applying the touch scan signal, the touch scan signal is applied to the plurality of electrodes during the third period of the nth frame if there is the touch input in the panel 100, while the touch scan signal is applied to the plurality of electrodes during the fourth period of the nth frame if there is no touch input in the panel 100, wherein the fourth period is shorter than the third period.

That is, since the period of applying the touch scan signal in the current frame when there is no touch input in the panel 100 during the previous frame is shorter than the period of applying the touch scan signal in the current frame when there is the touch input in the panel 100 during the previous frame, it is possible to reduce power consumption by preventing waste of power which might be unnecessarily consumed when there is no touch input.

Thereafter, the touch location, which is inputted to the plurality of electrodes, is sensed according to the touch scan signal applied to the plurality of electrodes (S7).

A method of driving the display device with integrated touch screen according to one embodiment of the present invention will be described with reference to FIG. 6.

In the timing diagram of FIG. 6A, there is illustrated a case in which the touch input of the panel 100 is shown during the n−2th frame and the n−1th frame. Thus, since there is the touch input in the panel 100 during the n−1th frame, the touch scan signal is applied during the third period of the nth frame.

In the timing diagram of FIG. 6B, there is illustrated a case in which the touch input of the panel 100 is shown during the n−2th frame, and the touch input of the panel 100 is not shown during the n−1th frame. Thus, since there is no touch input in the panel 100 during the n−1th frame, the touch scan signal is applied during the fourth period of the nth frame.

Figure 6C:
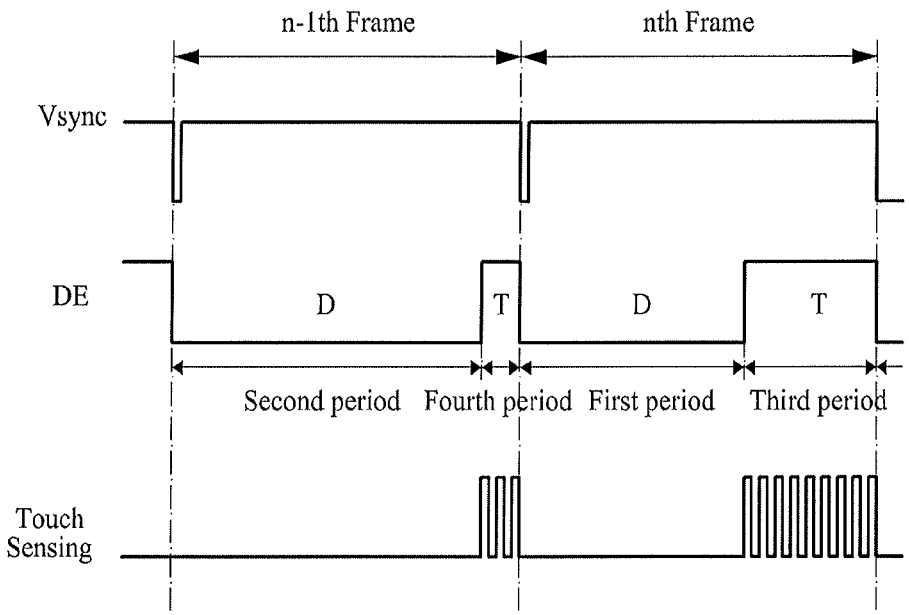

In the timing diagram of FIG. 6C, there is illustrated a case in which the touch input of the panel 100 is not shown during the n−2th frame, and the touch input of the panel 100 is shown during the n−1th frame. Thus, since there is the touch input in the panel 100 during the n−1th frame, the touch scan signal is applied during the third period of the nth frame.

Figure 6D:
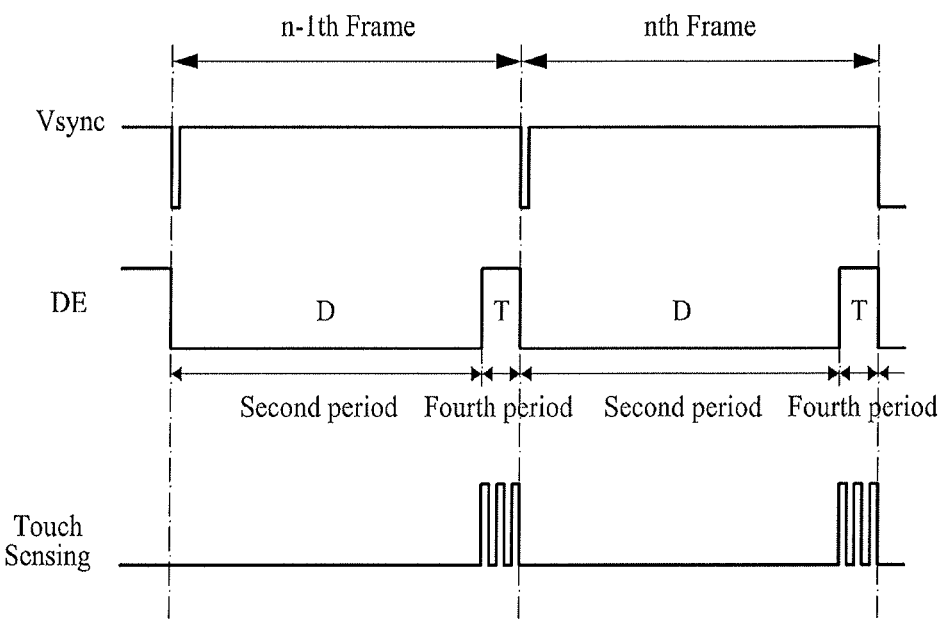

Similarly, in the timing diagram of FIG. 6D, there is no touch input in the panel 100 during the n−2th frame and n−1th frame. Thus, since there is no touch input in the panel during the n−1th frame, the touch scan signal is applied during the fourth period of the nth frame.

According to the embodiment of the present invention, the touch sensing time of the current frame may be adjusted according to whether or not there is the touch input during the previous frame in the display device with integrated touch screen, to thereby reduce power consumption.

Moreover, if there is no touch during the previous frame, the display time of the current frame is increased, to thereby improve picture quality and simultaneously to reduce power consumption by lowering the driving frequency.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A display device with integrated touch screen comprising:
   a panel including a plurality of electrodes, the panel being driven time-divisionally with a display driving period and a touch driving period for each frame period;
   a touch IC that applies a touch scan signal to the plurality of electrodes during a predetermined period of an n−1th frame ('n' is an integer above 2), checks whether or not there is a touch input in the panel through the use of information received from the plurality of electrodes, and outputs a signal indicating whether or not there is the touch input; and
   a display driver IC that receives the signal from the touch IC and applies a common voltage to the plurality of electrodes for a varied duration based on the signal,
   wherein the display driver IC applies the common voltage to the plurality of electrodes during a first period of an nth frame if there is the touch input in the panel, and applies the common voltage to the plurality of electrodes during a second period of the nth frame if there is no touch input in the panel, wherein the second period is longer than the first period,
   wherein the touch IC applies the touch scan signal to all of the plurality of electrodes during a third period of the nth frame if there is the touch input in the panel, and applies the touch scan signal to all of the plurality of electrodes during a fourth period of the nth frame if there is no touch input in the panel, wherein the fourth period is shorter than the third period, and
   wherein a first ratio of the display driving period to the touch driving period in the nth frame is greater than a second ratio of the display driving period to the touch driving period in the (n-1)th frame if there is no touch input in the panel during the (n-1)th frame period.

2. The display device of claim 1, wherein the third period corresponds to the remaining period except the first period during the nth frame.

3. The display device of claim 1, wherein the fourth period corresponds to the remaining period except the second period during the nth frame.

4. The display device of claim 1, wherein the display driver IC comprises:
   a common voltage generator that generates the common voltage; and
   a timing controller that generates a control signal according to a driving mode of the panel, so as to apply the common voltage generated in the common voltage generator to the panel, or the touch scan signal generated in the touch IC to the panel.

5. The display device of claim 4, wherein the timing controller applies a signal, which adjusts a period of applying the touch scan signal, to the touch IC according to the information, transmitted from the touch IC, showing whether or not there is the touch input in the panel.

6. The apparatus of claim 1, wherein a sum of the duration of the touch scan signal and the duration of the common voltage applied by the display driver is equal to the duration of the frame.

7. The apparatus of claim 6, wherein the duration of the common voltage applied by the display driver and the duration of the selected one of the first period or the second period do not overlap.

8. A method of driving a display device with integrated touch screen comprising:
   applying a touch scan signal from a touch IC to a plurality of electrodes during a predetermined period of an n−1 th frame ('n' is an integer above 2), and checking whether or not there is a touch input in the panel through the use of information received from the plurality of electrodes;
   outputting a signal from the touch IC to a display driver IC indicating whether or not there is the touch input;
   applying a common voltage from the display driver IC to the plurality of electrodes during a first period of an nth frame if there is the touch input in the panel;
   applying the common voltage from the display driver IC to the plurality of electrodes during a second period of the nth frame if there is no touch input in the panel, wherein the second period is longer than the first period,
   applying the touch scan signal from the touch IC to all of the plurality of electrodes during a third period of the nth frame if there is the touch input in the panel; and
   applying the touch scan signal from the touch IC to all of the plurality of electrodes during a fourth period of the nth frame if there is no touch input in the panel, wherein the fourth period is shorter than the third period,
   wherein the common voltage is applied to the plurality of electrodes for a varied duration based on the signal from the touch IC,
   wherein the panel is driven time-divisionally with a display driving period and a touch driving period for each frame period, and
   wherein a first ratio of the display driving period to the touch driving period in the nth frame is greater than a second ratio of the display driving period to the touch driving period in (n-1)the frame if there is no touch input in the panel during the (n-1)th frame period.

9. The method of claim 8, wherein the third period corresponds to the remaining period except the first period during the nth frame.

10. The method of claim 8, wherein the fourth period corresponds to the remaining period except the second period during the nth frame.

11. The method of claim 8, wherein a sum of the duration of the touch scan signal and the duration of the common voltage applied by the display driver is equal to the duration of the frame.

12. The method of claim 11, wherein the duration of the common voltage applied by the display driver and the duration of the selected one of the first period or the second period do not overlap.

* * * * *